June 14, 1960 R. GOSPODAR 2,940,249
EXHAUST HEAD FOR INTERNAL COMBUSTION ENGINES
Filed Oct. 23, 1956 2 Sheets-Sheet 1
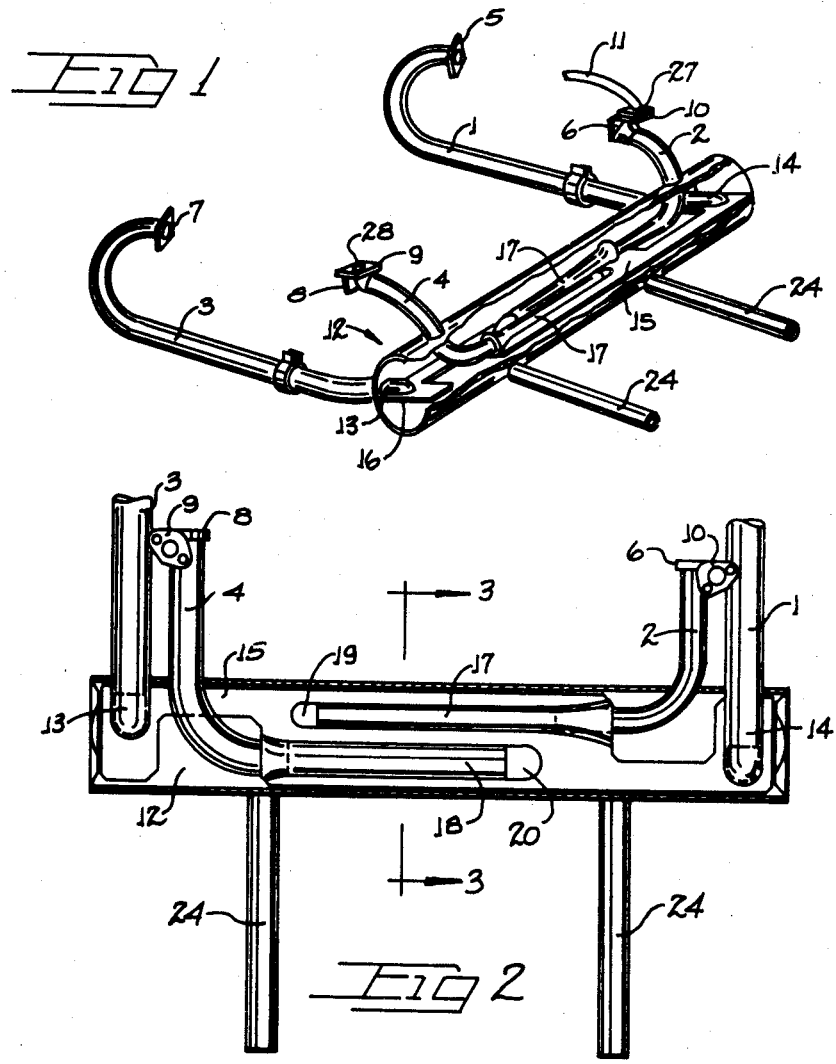
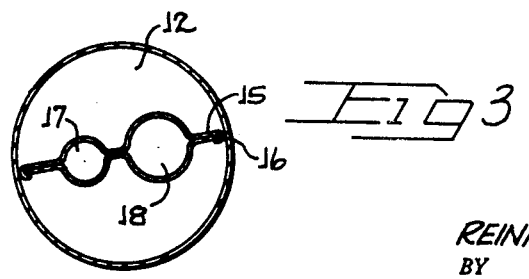
INVENTOR.
REINHARD GOSPODAR
BY
WILSON, LEWIS & McRAE

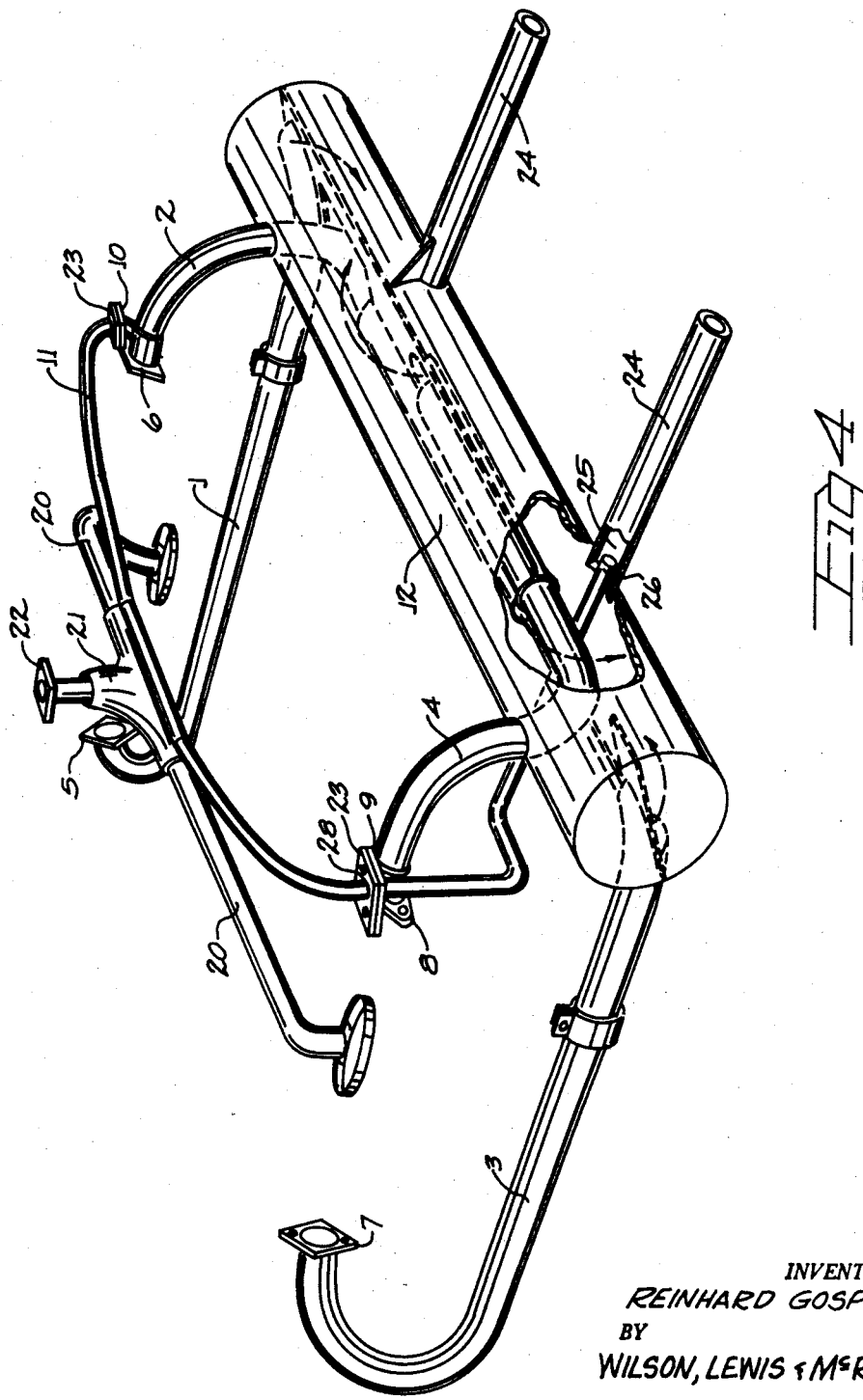

United States Patent Office 2,940,249
Patented June 14, 1960

2,940,249
EXHAUST HEAD FOR INTERNAL COMBUSTION ENGINES

Reinhard Gospodar, Wolfsburg, Germany, assignor to Volkswagenwerk G.m.b.H., Wolfsburg, Germany Filed Oct. 23, 1956, Ser. No. 617,872

Claims priority, application Germany Oct. 25, 1955

6 Claims. (Cl. 60—32)

This invention concerns an exhaust system for use in multicylinder internal combustion engines, particularly engines having the end of the exhaust system located behind the engine, and utilising exhaust gas extraction for heating purposes, whereby the exhaust gases are conducted from each cylinder separately through exhaust gas pipes to an exhaust head acting as a noise damper or silencer.

In known engines of this kind, the exhaust gas pipes vary in length owing to the different distances between the individual cylinders and the silencer. The result is that the exhaust gases from the cylinders do not enter the silencer at uniform intervals but with a delay corresponding to the varying lengths of pipes concerned. With the simultaneous merging together of the gases from two or more cylinders, there occurs on occasions an increase of the pressure values, by means of which the exhaust noises are amplified, and which may lead to inadmissible high mechanical stresses on the silencer, owing to the short pipe lengths. The latter also do not permit sufficient back pressure for an effective extraction of exhaust gas for heating purpose. In addition to this, the human ear finds bursts of sound occuring successively far more disturbing than those occurring at uniform intervals.

It has already been proposed to provide equally long exhaust gas pipes leading to a common collecting pipe, or to adapt such pipes so as to synchronize them for obtaining an equally effective length of exhaust pipe, but these known arrangements occupy a large space between the exhaust pipe and the cylinders and require costly pipe arrangements without providing an inexpensive and effective silencing of sound and still utilizing the shortest practicable and cheapest pipes.

It is an object of the invention to provide an effective exhaust system suitable for mass production, particularly advantageous for four-cylinder engines with horizontally arranged, opposed cylinders, which is accomodated in a small space immediately behind the engine, and which allows the exhaust gases to be extracted for heating purposes.

According to the present invention, for obtaining uniform exhaust conditions and equally long exhaust gas pipes, the end of the exhaust gas pipe is correspondingly extended into the exhaust head. For this purpose, and in order to allow sheet metal parts suitable for mass production to be employed, there are arranged in the silencer in the longitudinal dividing plane thereof, two plates provided with depressions of somewhat circular cross-section, adjacently disposed in such a manner that the depressions in both plates form cylindrical extensions of the exhaust gas pipes discharging therein. The extraction of exhaust gases for heating purposes is preferably carried out in such a manner that behind the extracting point the diameter of the pipe is either reduced or the pipe length is kept shorter. As the exhaust gas back pressure, when the exhaust end is located directly behind the engine space, does not allow sufficient exhaust gas to be extracted without enlarging the pipe, it is convenient with exhaust pipes which are kept to a short length, to allow the branch exhaust gas pipe to discharge again in an ejector-like manner into the main exhaust gas flow at the outlet of the exhaust head. It is particularly advantageous for the ejector-like shaped end of the branch pipe to lead into a connecting pipe of the exhaust head which is adapted as an absorption silencer.

The equalizing of the exhaust gas pipes as regards length and diameter for obtaining uniform and noise silencing exhaust conditions within the exhaust head, results in a particularly convenient space saving design by means of light and cheaply manufactured sheet metal parts. The diverting of exhaust gases in front of the exhaust head, e.g. for preheating the mixture induction pipe may also readily be taken into consideration in the dimension of the exhaust gas pipe within the exhaust head, whereby the existing low back pressure of the exhaust gases may be cancelled owing to the comparatively short pipes used, without having to increase the pipe dimensions and thus adding to costs and often presenting difficulties, in that the branch exhaust gas pipe is allowed to lead in an ejector-like manner into the main flow of the exhaust gases at the end of the exhaust head. The discharge point is conveniently located in an outlet pipe of the exhaust head adapted as an absorption silencer.

The invention will be described further, by way of example, with reference to the accompanying generally diagrammatic drawings, in which:

Fig. 1 is a perspective view of an exhaust system for a four-cylinder internal combustion engine, Fig. 2 is a plan view of an exhaust head cut open along a central, horizontal longitudinal plane, Fig. 3 is a cross-section taken on the line III—III of Fig. 2, Fig. 4 is a perspective view of an alternative arrangement of exhaust system for a four cylinder engine employing waste gas heating of the mixture induction pipe.

In the drawings, the reference numerals 1, 2, 3, 4 denote waste gas or exhaust pipes leading to each of the cylinders of an internal combustion engine. The pipes lead to the cylinders (not shown) which are arranged side by side in pairs and opposite one another in the horizontal plane in what is termed the "Boxer" arrangement, and said pipes have flanges 5, 6, 7, 8 provided on the end thereof by which they are screwed to the outlet openings of each cylinder. The flanges 6 and 8 have additional flanges 9 and 10 arranged perpendicularly thereto having openings 27, 28 for fixing a branch pipe 11. The branch pipe 11 communicates with the exhaust pipe 2 by means of the opening 27 and serves to heat the mixture induction pipe. The pipes 1 to 4 lead to the exhaust head 12 disposed immediately behind the engine block parallel to the cylinders. This exhaust head or silencer 12, a closed cylinder, serves in the first place to dampen noise. While the pipes 1 and 3 project into the exhaust head 12 by their ends 13, 14 of different length but small dimensions, and at the point of entry through the wall of the silencer are welded to the exhaust head 12, the ends of the pipes 2 and 4 are continued into the exhaust head 12, the line of the pipe being bent at 90° and being extended in the longitudinal direction of the exhaust head. For this purpose, there are arranged in the central longitudinal plane of the exhaust head 12, two superposed pressed sheet metal parts 15 and 16 having longitudinal depressions 17, 18 of somewhat circular cross-section extending in the longitudinal direction. By superposition the plates there are created tubular hollow spaces 17, 18, in which the turned-over ends of the pipes 2 and 4 are layed. The depressions are opened at the ends by means of corresponding cut-outs 19, 20. According to the invention, it is possible for uniform exhaust pipe length to be obtained not only if the length of the exhaust pipe within the exhaust head is different, but also with a different diameter thereof. The equivalency of a change in diameter to change in length is readily apparent from a consideration of the properties of a gas. The velocity of a gas, which is the value of interest when considering the time it takes to travel through a pipe, is directly related to the pressure of the gas, which in turn is directly related to the volume of the gas. When gas is bled off from the exhaust pipe, the velocity of the gas continuing into the muffler may be kept constant by reducing the diameter of the extension inside the muffler. In essence, this results in maintaining the pressure at a constant. If the diameter were not reduced, the gas would expand and the pressure would be reduced, with a consequent reduction in velocity. On the other hand, the velocity can be allowed to decrease and there will still be a regular sequence of explosions in the muffler if the decrease in velocity is compensated for by means of a shorter length of extension pipe. Therefore, according to Fig. 2, the pipe portion 17 is kept smaller in cross-section than the corresponding pipe portion 18, because waste gases have already been extracted from the waste gas pipe 2 before reaching the exhaust head 12, through the pipe 11 for the purpose of preheating the induction mixture. This exhaust gas extraction is taken into account by the reduction of the pipe cross-section in the pipe portion 17.

Fig. 4 shows how, by conducting the waste gases diverted through the pipe 11 past a mixture induction pipe 20, the induction mixture carried in the pipe 20 is preheated. The branch pipe 11, for this purpose, is brazed or otherwise connected metallically to a T-member 21, which by means of a flange 22 thereon is adapted to be connected to the carburetter and on either side leads to the inlet ports of the cylinder. For reasons of symmetry the branch pipe 11 leads to the flange 9 of the opposed exhaust pipe 4, without however, communicating with the latter. The flange 9 merely serves to secure the branch pipe 11 by means of its end flange 23, which is continued to lead into the exhaust head 12 and finally in an ejector-like manner into an exhaust socket or end pipe 24 forming an absorption silencer. This end pipe 24 is lined with a layer of material 25 having noise silencing or dampening properties. The main exhaust gas flow escaping from the exhaust head or silencer 12 produces at the end 26 of the pipe 11 a negative pressure which causes an increase in the volume of exhaust gas passing through the pipe 11.

What we claim is:

1. An exhaust head for a multi-cylinder internal combustion engine comprising an exhaust collecting chamber having an outlet and located immediately adjacent an engine; exhaust pipes of different lengths leading from each cylinder of the engine to said chamber; said pipes being provided with extensions of different lengths leading into the chamber; and at least two of said extensions being in overlapping relation with one another within the chamber, the various extensions being of predetermined lengths such as to provide exhaust pipe assemblies of the same total length, thereby maintaining a regular sequence of equal time intervals of exhaust discharges into the collecting chamber.

2. An exhaust head for a multi-cylinder internal combustion engine wherein a portion of the exhaust gases are utilized for heating purposes comprising an exhaust collecting chamber having an outlet and located directly adjacent an engine, exhaust pipes of different lengths leading from each cylinder of the engine to the chamber; said exhaust pipes being provided with extensions of different lengths within the chamber which equalize their lengths thereby maintaining a regular sequence of equal time intervals of exhaust discharges from the exhaust pipes; said extensions terminating within the chamber whereby the exhaust gases are ejected into the chamber to form a main stream of exhaust gases which is ejected from the chamber; and a branch heating exhaust pipe leading from one of said exhaust pipes and directed into the chamber to eject exhaust gases into said main stream of exhaust gases.

3. An exhaust head for a multi-cylinder internal combustion engine comprising an exhaust collecting chamber having an outlet and located directly adjacent an engine; main exhaust pipes of different lengths leading from each cylinder of the engine to the chamber; said main exhaust pipes being provided with extensions of different lengths within the chamber which equalize the lengths of said pipes; a branch heating exhaust pipe leading from one of said main exhaust pipes; the extension of said last mentioned main exhaust pipe within the chamber having a reduced cross-sectional area which prevents a pressure drop in said last mentioned exhaust pipe thereby maintaining a regular sequence of equal time intervals of exhaust discharges into said chamber.

4. An exhaust head for a multi-cylinder internal combustion engine comprising an exhaust collecting chamber having an outlet and located directly adjacent an engine; main exhaust pipes of different lengths leading from each cylinder of the engine to the chamber; said main exhaust pipes being provided with extensions of different lengths within the chamber; a branch heating exhaust pipe leading from one of the main exhaust pipes; the chamber extensions of the other main exhaust pipes each having a length to equalize the overall length of said other main exhaust pipes; the chamber extension for said main exhaust pipe from which a branch leads being of a length to provide an overall length for said pipe which is less than the overall length of said other main exhaust pipes to compensate for the lower velocity due to the pressure drop in said last mentioned exhaust pipe thereby maintaining a regular sequence of equal time intervals of exhaust discharges from each of the exhaust pipes into said chamber.

5. An exhaust head as claimed in claim 1 and further characterized in that the extensions for two of the exhaust pipes comprise a pair of longitudinally extending plates in facial contact provided within the chamber; each plate having a pair of longitudinal depressions which register with the depressions in the opposite plate to form a pair of open ended conduits.

6. An exhaust head as claimed in claim 2 and further characterized in that the chamber is provided with an outlet opening having an outlet pipe connection; and said branch heating exhaust pipe is terminated within the outlet pipe connection.

References Cited in the file of this patent

UNITED STATES PATENTS

| | | |
|---|---|---|
| 1,220,307 | Yocum et al. | Mar. 27, 1917 |
| 1,342,159 | Champaign | June 1, 1920 |
| 2,073,951 | Servais | Mar. 16, 1937 |
| 2,235,705 | Haas et al. | Mar. 18, 1941 |
| 2,692,025 | Maxim | Oct. 19, 1954 |

FOREIGN PATENTS

| | | |
|---|---|---|
| 760,421 | Germany | May 4, 1953 |
| 12,898 | Great Britain | Dec. 22, 1905 |